April 14, 1925.  1,533,246
H. A. HANDS
COMMUTATOR SOLDERING IRON
Filed Sept. 16, 1922
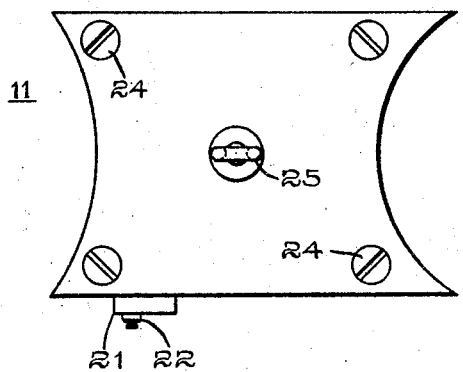
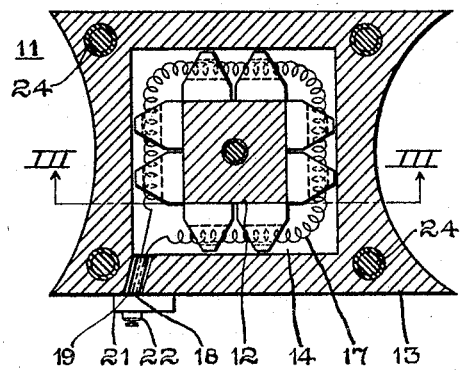
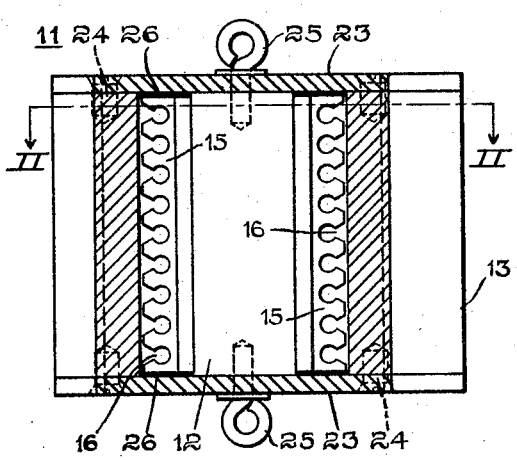
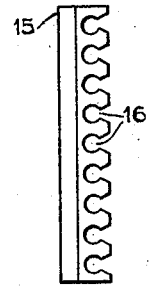
WITNESSES:
C. N. Cochran
H. M. Biebel
INVENTOR
Howard A. Hands
BY
Wesley G. Carr
ATTORNEY Patented Apr. 14, 1925.

1,533,246

UNITED STATES PATENT OFFICE.

HOWARD A. HANDS, OF WILKINSBURG, PENNSYLVANIA, ASSIGNOR TO WESTING-HOUSE ELECTRIC & MANUFACTURING COMPANY, A CORPORATION OF PENNSYL-VANIA.

COMMUTATOR SOLDERING IRON.

Application filed September 16, 1922. Serial No. 588,559.

*To all whom it may concern:*

Be it known that I, HOWARD A. HANDS, a citizen of the United States, and a resident of Wilkinsburg, in the county of Allegheny and State of Pennsylvania, have invented a new and useful Improvement in Commutator Soldering Irons, of which the following is a specification.

My invention relates to electrically-heated devices and, particularly, to electrically-heated soldering irons.

The object of my invention is to provide a relatively simple, compact and rugged structure for an electrically-heated commutator soldering iron.

In practicing my invention, I provide a central metallic core member located within a hollow metallic casing, all of the outer longitudinal surfaces of which are of arcuate form in lateral section. A plurality of refractory resistor-supporting members are located between the central core and the inner wall of the casing and support a suitable resistor member. End plates, having a contour substantially similar to that of the casing, are provided at the ends of the core and the casing and are suitably secured thereagainst. Means are provided for suspending the soldering iron from a suitable supporting means.

In the single sheet of drawings,

Figure 1 is a top plan view of a device embodying my invention;

Fig. 2 is a view in lateral section thereof taken on the line II—II of Fig. 3;

Fig. 3 is a view in longitudinal section thereof taken on the line III—III of Fig. 2;

Fig. 4 is a view, in side elevation, of a refractory resistor supporting member, and Fig. 5 is a top plan view thereof.

A soldering iron, designated generally by the numeral 11, comprises a central metal core member 12, which may be substantially square in cross-section. An outer metallic casing 13 is located around the central core 12 and has an internal chamber 14 of such dimensions as to leave a substantial space between the central core and the inner wall of the casing. The outer metal casing is substantially co-extensive with the inner central core. The outer longitudinal surfaces of the casing 13 may be of any desired shape in lateral section in order that the surfaces may be adapted to co-operate with and closely engage a relatively large area of arcuate surface which is to be soldered. As illustrated in Figs. 1 and 2 of the drawing, two of the four surfaces may be substantially plane and the other two may be arcuate and may have different radii. This permits of employing the soldering iron with a predetermined diameter of commutator and, if the outer surfaces of the casing are made convex, the iron may be employed to solder a plurality of commutator necks simultaneously.

A plurality of elongated and relatively narrow electrical-insulating refractory members 15 are provided in the space between the central core 12 and the inner wall of the casing 13. Each of the members 15 is provided with a plurality of undercut and laterally-extending grooves 16 to permit of supporting therein a suitable resistor member 17 which is here illustrated as comprising a helically-wound resistor member. The ends of the resistor member 17 may be brought out through an opening 18 in one of the walls of the casing 13, a tube 19 of a suitable insulating material being employed as a lining for the opening 18. A plate 21 of suitable insulating material may support a control switch 22 mounted thereon to which the ends of the resistor member 17 and the ends of a suitable supply-circuit conductor (not shown) are connected.

At each end of the casing 13 and of the central core 12 is provided an end plate 23 having substantially the same contour as the casing 13. Each of the end plates may be suitably secured against the casing 13 by a plurality of screws 24. Eye bolts 25 may be employed to secure the central portion of the end plates against the central core 12 and may also serve as means for securing to the soldering iron a plurality of ropes or chains by which the iron may be suspended above a commutator to be soldered.

In order to resiliently support the resistor-supporting members 15 in their proper operative positions within the casing 13, I provide a layer 26 of a suitable heat-insulating material, such as asbestos, between the ends of the members 15 and the inner adjacent surface of the respective end plates 23. The device embodying my invention may be supported, as hereinbefore stated, by any suitable means which will permit of bringing one of the convex arcuate surfaces against a plurality of commutator segments or commutator necks and allowed to remain in operative and heat-conducting engagement therewith until the proper soldering operation has been effected, in a well-known manner in the art. The length of the device may be made any predetermined or desired amount and may be made somewhat longer than the length of the surface which it is desired to solder in order that not only that portion of the surface which is to be actually soldered but also those portions immediately adjacent thereto may be heated in order to effect a proper soldering operation which, as is well known, requires that the parts be heated to a relatively high temperature. The device embodying my invention may be provided with any desired number of external surfaces which may be given any desired degree of curvature to permit of employing the same iron with a relatively large number of different sizes of commutators or of surfaces having different degrees of curvature.

Various modifications may be made in the device embodying my invention without departing from the spirit and scope thereof, and I desire, therefore, that only such limitations shall be placed thereon as are imposed by the prior art or are specifically set forth in the appended claims.

I claim as my invention:—

1. A soldering iron comprising a central metal core, a metal casing spaced from and surrounding said central core and having a convex soldering face on its outer surface, a plurality of relatively narrow, elongated, grooved refractory resistor-supporting members located adjacent to said central core, and a resistor member located in said resistor-supporting members.

2. A soldering iron comprising a central metal core, an open-end metal casing spaced from and surrounding said central core and having a plurality of soldering faces on its longitudinal surface, a plurality of relatively narrow, elongated, refractory resistor-supporting members substantially coextensive with, and located adjacent to, the longitudinal surface of the central core, a resistor member in said resistor-supporting members, and a plurality of metal end plates for enclosing the open-end metal casing and for providing a heat path from said central core to said casing.

3. In a soldering iron, in combination, an open-end metal casing having a soldering face on its outer surface, a central metal core located within said casing, an electric-heating element located between said core and said casing, and a plurality of metal end plates for enclosing the open ends of said casing and for providing a heat path from said central core to said casing.

4. In a soldering iron, in combination, an open-end metal casing having a plurality of soldering faces, of arcuate form, on its outer surface, a central metal core within said casing and spaced therefrom, an electric heating element located between said core and said casing, and metal end plates for enclosing the open ends of said casing and for providing a heat path from said core to said casing.

5. In a soldering iron, in combination, an open-end metal casing having a plurality of soldering faces, of arcuate form and of different radii, on its outer surface, a central metal core within said casing and spaced therefrom, an electric heating element between said core and casing, metal end plates for enclosing the open ends of said casing and for providing a heat path from said core to said casing, and means for holding said central core in proper operative position relatively to said casing and for permitting of suspending said iron in operative position.

In testimony whereof, I have hereunto subscribed my name this 12th day of September 1922.

HOWARD A. HANDS.